US008285934B2

(12) United States Patent  (10) Patent No.: US 8,285,934 B2
Porel et al. (45) Date of Patent: *Oct. 9, 2012

(54) REDUNDANCY ARRAY OF INEXPENSIVE DISKS CONFIGURATION USING SIMPLE NETWORK MANAGEMENT PROTOCOL

(75) Inventors: Partha P. Porel, Calcutta (IN); Tanmoy Sil, West Bengal (IN)

(73) Assignee: LSI Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/324,206

(22) Filed: Dec. 13, 2011

(65) Prior Publication Data

US 2012/0144114 A1 Jun. 7, 2012

Related U.S. Application Data

(63) Continuation of application No. 12/045,209, filed on Mar. 10, 2008, now Pat. No. 8,112,582.

(51) Int. Cl.
*G06F 13/00* (2006.01)
(52) U.S. Cl. .......................... 711/114; 711/161; 709/221
(58) Field of Classification Search .................. 711/114, 711/161; 709/221
See application file for complete search history.

(56) References Cited

U.S. PATENT DOCUMENTS 7,685,261 B1 3/2010 Marinelli et al. ............. 709/220
2007/0150561 A1 6/2007 Courtney ...................... 709/220

OTHER PUBLICATIONS

Storage networking Industry Association, "Common Disk Data Format Specification", Revision 1.2, Jul. 28, 2006, pp. 1-99.
Torsten Kile et al., "Integrating SNMP Agents With XML-Based Management Systems", Jul. 2004, pp. 1-16.

*Primary Examiner* — Jared Rutz
(74) *Attorney, Agent, or Firm* — Christopher P. Maiorana, PC

(57) ABSTRACT

A method of configuring a storage device is disclosed. The method generally includes the steps of (A) receiving a single data unit over a communication network, the data unit (i) being transferred via the communication network using a standard communication protocol, (ii) defining both (a) a plurality of new configuration items that define a new configuration of the storage device and (b) a command to be performed by the storage device and (iii) having a standard markup language format, (B) calculating at least one configuration change from a plurality of current configuration items to the new configuration items, the current configuration items defining a current configuration of the storage device, (C) adjusting the storage device into the new configuration based on the at least one configuration change and (D) performing a requested operation with the storage device in the new configuration in response to the command.

20 Claims, 5 Drawing Sheets

REDUNDANCY ARRAY OF INEXPENSIVE DISKS CONFIGURATION USING SIMPLE NETWORK MANAGEMENT PROTOCOL

This is a continuation of U.S. Ser. No. 12/045,209, filed Mar. 10, 2008, now U.S. Pat. No. 8,112,582, which is incorporated by reference.

FIELD OF THE INVENTION

The present invention relates to Redundant Array of Inexpensive Disks (RAID) systems generally and, more particularly, to a method and/or apparatus for implementing a RAID configuration using a Simple Network Management Protocol (SNMP).

BACKGROUND OF THE INVENTION

Conventional RAID devices lack easy and standard configuration schemes. Existing RAID configuration schemes are either complex or proprietary. Work is currently under way to develop a standard scheme for handling RAID configurations known as the Storage Management Initiative-Specification (SMI-S). However, the SMI-S specification is not yet fully complete and is complex to implement.

Configuring RAID devices over networks raises security and standardization issues. Users are commonly responsible for implementing data security measures and communication mechanisms to account for the lack of security and standardization. In practice, users implement proprietary schemes for exchanging RAID configuration data over the networks. The proprietary schemes make interacting with different RAID device controllers from different vendors difficult.

SUMMARY OF THE INVENTION

The present invention concerns a method of configuring a storage device. The method generally includes the steps of (A) receiving a single data unit over a communication network, the data unit (i) being transferred via the communication network using a standard communication protocol, (ii) defining both (a) a plurality of new configuration items that define a new configuration of the storage device and (b) a command to be performed by the storage device and (iii) having a standard markup language format, (B) calculating at least one configuration change from a plurality of current configuration items to the new configuration items, the current configuration items defining a current configuration of the storage device, (C) adjusting the storage device into the new configuration based on the at least one configuration change and (D) performing a requested operation with the storage device in the new configuration in response to the command.

The objects, features and advantages of the present invention include providing a method and/or apparatus for implementing a RAID configuration using an SNMP that may (i) provide a vendor independent solution, (ii) avoid new and proprietary protocols, (iii) utilize industrial-standard protocols and industrial-standard data structures, (iv) configure RAID devices through SNMP, (v) consume less time than conventional approaches, (vi) utilize the SNMP for security and communication protocol, (vii) provide a common RAID configuration management solution using vendor supplied SNMP agents, (viii) improve readability of the configuration information that may help detecting errors and/or debugging and/or (x) provide a minimal impact on network quality of service.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention generally sends all Redundant Array of Inexpensive Disk (RAID) configuration related information through a communication network using an industrial-standard protocol, such as the Simple Network Management Protocol (SNMP). The configuration information may originate in one or more manager stations (or devices) and is then sent to an agent machine (or device). After receiving the configuration information, the agent machine may configure the appropriate RAID device.

Figure 1:
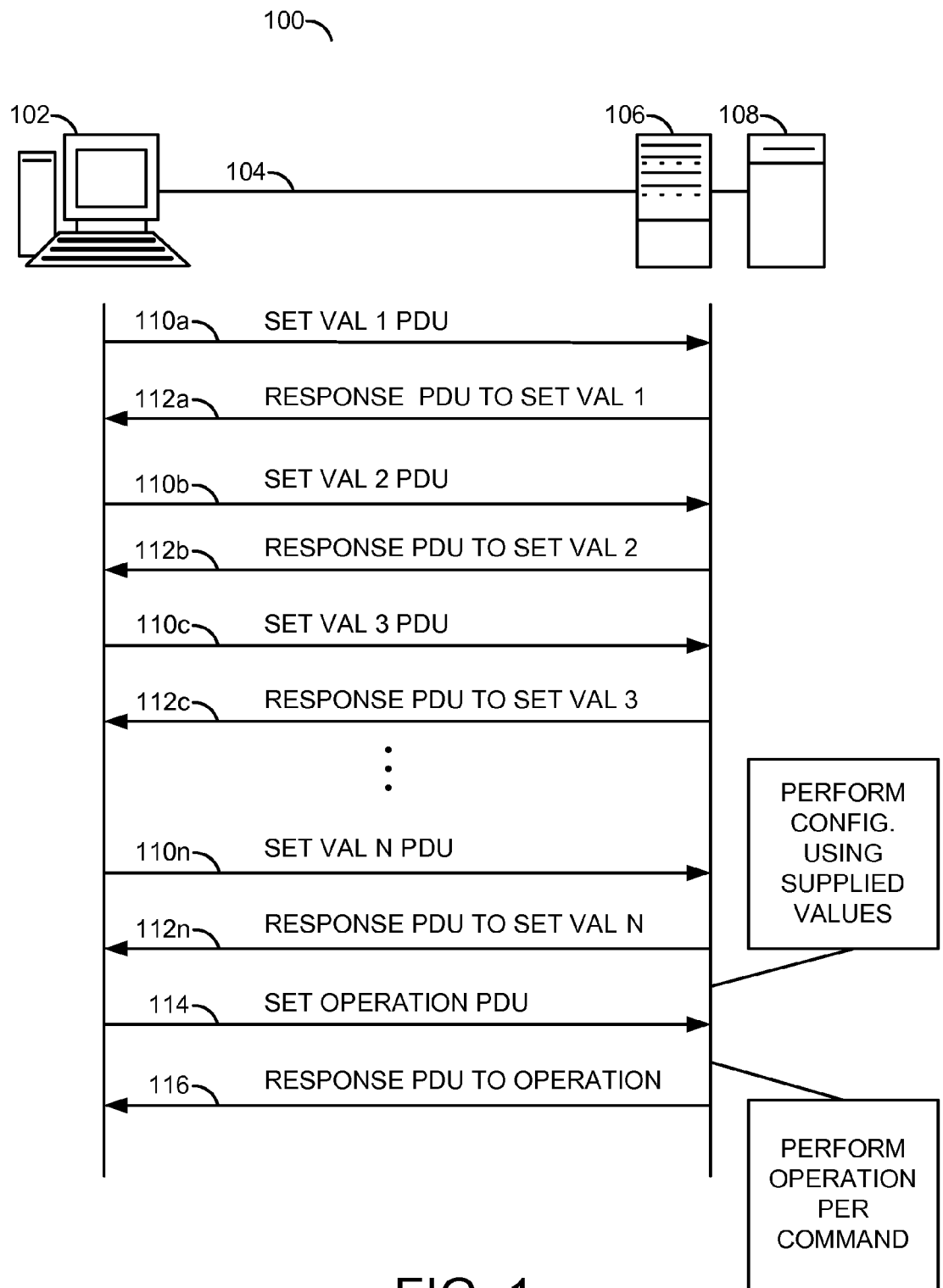
FIG. 1 is a diagram of a first example implementation of a system.

Referring to FIG. 1, a diagram of a first example implementation of a system 100 is shown. The system (or apparatus) 100 may implement a RAID configuration scheme. The system 100 generally comprises a device (or circuit) 102, a device (or circuit) 104, a device (or circuit) 106 and a device (or circuit) 108. The device 102 may implement a manager station. The device 106 may implement an agent machine. The device 108 may implement a RAID (or memory) device. The device 104 may implement one or more networks that enable the device 102 and the device 106 to exchange information with each other.

Configuring the RAID device 108 generally involves the device 102 supplying a larger amount of information to a RAID controller in the device 106. Using a common SNMP-Set, a single variable may be sent to the device 106 at a time via the network 104. Multiple SNMP-Sets may be transmitted from the device 102 to the device 106 to communicate multiple (e.g., N) variables (or attributes). Setting N variables may involve transmitting N SET-Packet Data Units (PDUs) 110*a*-110*n* from the device 102 to the device 106. In response, the device 106 may transmit N Response-PDUs 112*a*-112*n* back to the device 102, resulting in 2N transmissions. Furthermore, another SET-PDU 114 may be transmitted from the device 102 to the device 106 to transfer an operation command. The operation command may cause the device 108 to perform a desired operation using previously transmitted values. The device 106 generally sends a Response-PDU 116 back to the device 106 after performing the requested operation, resulting in 2N+2 total PDU transfers across the network 104.

An example Management Information Base (MIB) having N example SET-PDUs may be as follows:

---

Operation object types; syntax = integer (e.g., 32); maximum access = read-write; status = current; describe = "Set the value for desired operation."; and ::= { 1 }.

Value 1 object type; syntax = integer (e.g., 32); maximum

```
access = read-write; status = current; describe = "Value 1 for
desired operation."; and ::= { 2 }.
    Value 2 object type; syntax = integer (e.g., 32); maximum
access = read-write; status = current; describe = "Value 2 for
desired operation."; and ::= { 3 }.
    Value 3 object type; syntax = octet string; maximum access =
read-write; status = current; describe = "Value 3 for desired
operation."; and ::= { 4 }.
    Value N object type; syntax = integer (e.g., 32); maximum
access = read-write; status = current; describe = "Value N for
desired operation."; and ::= { N+1 }.
```

Figure 2:
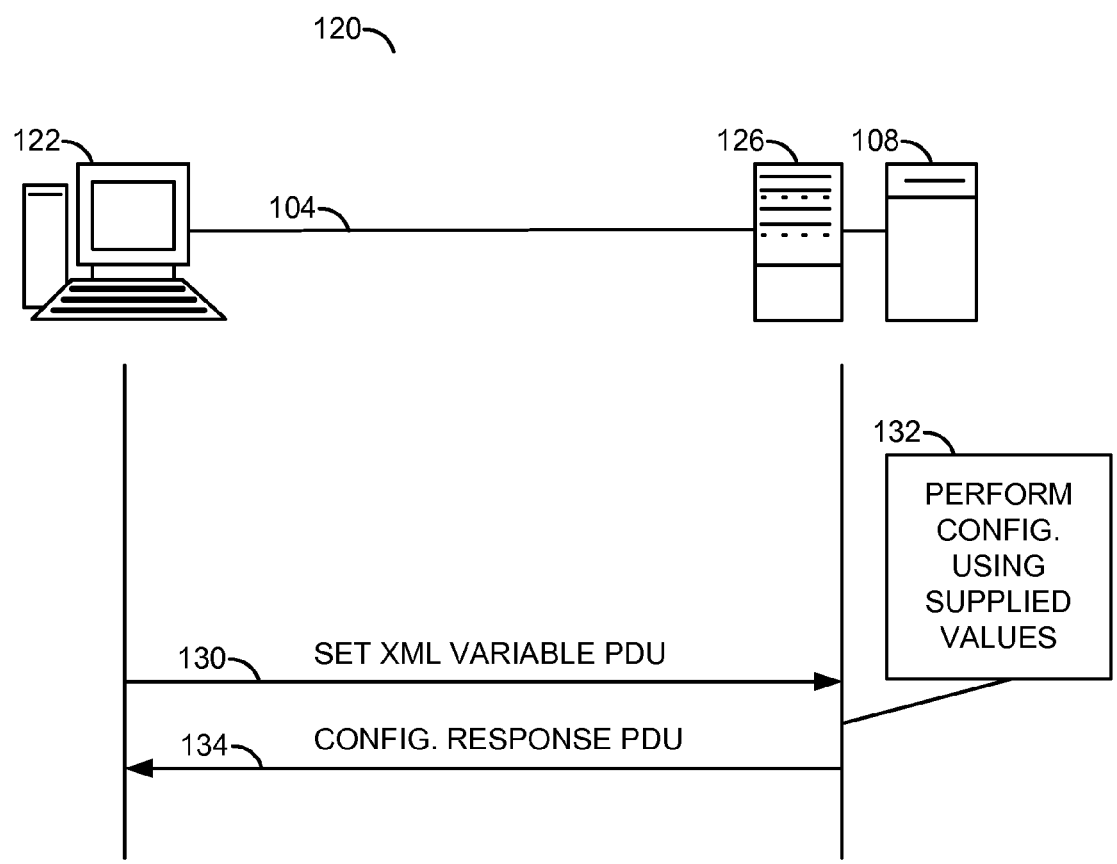
FIG. 2 is a block diagram of a second example implementation of a system in accordance with a preferred embodiment of the present invention.

Referring to FIG. 2, a block diagram of a second example implementation of a system 120 is shown in accordance with a preferred embodiment of the present invention. The system (or apparatus) 120 may implement another RAID configuration scheme. The system 120 generally comprises the network 104, the memory device 108, a device (or circuit) 122 and a device (or circuit) 126. The device 122 may implement a manager station. The device 126 may implement an agent machine.

The device 122 generally consolidates all the attributes used to configure the memory device 108 in an Extensible Markup Language (XML) format. The device 122 may construct a predefined XML structure containing all of the configuration data for the memory device 108. The structure may then be packages and transmitted to the device 126 via the network 104. The device 126 may utilize the configuration information to reconfigure the memory device 108, as appropriate, and then perform the requested operation. As a result, the system 120 may send a single data unit 130 from the device 122 to the device 126. After performing the configuration 132, the device 126 may transmit a single Response-PDU 134 back to the device 122, resulting in only two PDU transfers across the network 104. The low number of PDU transfers generally minimizes loading of the network traffic thereby improving the quality of service (QoS) on the network 104.

An example MIB for the system 120 may be as follows: configData object type:

```
    Syntax = display string; maximum access = read-write; status
= current; describe = "Set the XML in proper structure for desired
operation."; and   ::= { 1 }.
```

An example structure of the configuration information in XML format may be as follows:

```
<!--
    XML sample to perform Operation.
-->
<Operation1 attrib_1 = "val_1" attrib_2 = "val_2" ... attrib_N =
"val_N" />
```

All relevant information may be provided in the XML format to configure the memory device 108. In some embodiments, the relevant information may be defined by the Storage Networking Industry Association (SNIA) of San Francisco, Calif. The SNIA has defined a Common RAID Disk Data Format (DDF) Specification, Revision 1.2, Jul. 28, 2006, which is hereby incorporated by reference in its entirety. The Common RAID DDF Specification generally defines a standard data structure describing how data is formatted across the disks in a RAID group. The DDF structure may allow interoperability between different suppliers of RAID technology. The Common RAID DDF structure generally benefits storage users by enabling data-in-place migration among RAID systems from different vendors.

The present invention generally follows the DDF specification in defining the XML structure. Redundant, unused and irrelevant data for configuration purposes may be omitted from the XML structure to create the configuration XML. The omitted data generally helps to decrease a size of the PDUs 132 and/or 134.

Figure 3:
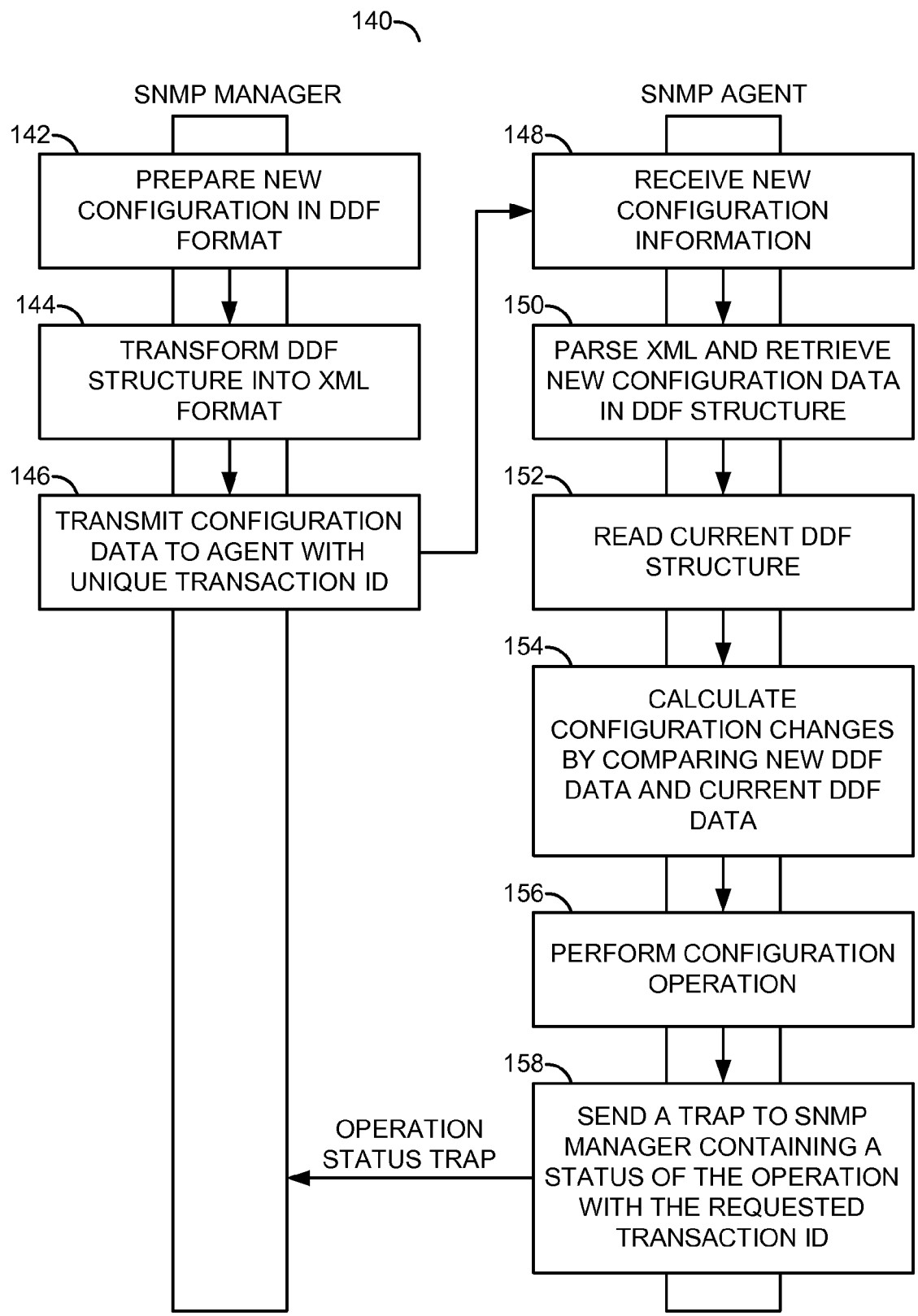
FIG. 3 is a flow diagram of an example method of configuring a RAID device.

Referring to FIG. 3, a flow diagram of an example method 140 of configuring the RAID device 108 is shown. The method (or process) 140 may be implemented by the system 120. The method 140 generally comprises a step (or block) 142, a step (or block) 144, a step (or block) 146, a step (or block) 148, a step (or block) 150, a step (or block) 152, a step (or block) 154, a step (or block) 156 and a step (or block) 158.

In the step 142, the device 122 may generate a new configuration for the device 108 by arranging new configuration information in a standard format (e.g., the DDF format). The standard format may be transformed by the device 122 in the step 144 into a standard markup language format (e.g., the XML format). In the step 146, the new configuration information in XML format may be packaged into a single PDU and then transmitted to the device 126 over the network 104.

The device 126 may receive the PDU from the network 104 in the step 148. In the step 150, the device 126 may parse the XML to retrieve the new configuration items in the DDF structure. The current configuration items last used to configure the memory device 108 may be read from a memory (or buffer) in the step 152. The device 126 may be responsible for identifying changes in the new configuration items by differentiating the current DDF configuration data with the new DDF configuration data received from the device 122. The device 126 may reconfigure the memory device 108 in the step 156 using the configuration differences calculated in the step 154. The memory device 108 may then perform the requested operation in the step 156. A status message concerning the requested operation may be generated by the device 126 in the step 158 and then transmitted back to the device 122.

An example of the configuration items found in the XML format are generally as follows. A variable (e.g., Full_Configuration) may establish a full RAID configuration (e.g., "1") or a partial RAID configuration (e.g., "0"). An indication of a "Full configuration" generally means that the XML contains an existing and new virtual disk configuration, typically useful for small storage systems. An indication of a "partial RAID configuration" may mean that the XML may contain only new configuration data, typically useful for large storage systems.

A unique identification (ID) value (e.g., Unique_Request_ID) is generally provided for each request. The unique ID value may be used by the device 122 to correlate the status messages returned from the device 126 with the operation commands send to the device 126. For example, after the device 126 has implemented the new RAID configuration, a status PDU message may be generated containing both (i) RAID configuration result and (ii) the unique ID value. In some embodiments, the unique ID value may be a Globally Unique ID (GUID) having a multi-bit (e.g., 24 bit) length. Other bit lengths may be implemented to meet the criteria of a particular application.

A header section may be included in the DDF data. The DDF header may be global in context with respect to disk groups or related physical disks. The DDF header generally includes a DDF header globally unique ID field (e.g., DDF_Header_GUID) for the configuration or group.

A disk grouping field (e.g., Disk_Grouping) may indicate if a disk grouping is enforced (e.g., 0x00) or not enforced (e.g., 0x01).

A maximum number of physical disk entries field (e.g., Max_PD_Entries) is generally defined in the header. The maximum number of physical disk entries is commonly implementation dependent. An actual number of physical disks supported by a controller may be less than a number of entries allowed. The DDF structure implementations should allow particular values (e.g., 15 (0x000F), 63 (0x003F), 255 (0x00FF), 1023 (0x03FF) and 4095 (0x0FFF)).

A maximum number of virtual disk entries field (e.g., Max_VD_Entries) may by included in the DDF header. The number of virtual disk entries is generally implementation dependent. An actual number of virtual disks supported by a controller may be less than a number of entries allowed. A DDF structure implementation should allow particular values (e.g., 15 (0x000F), 63 (0x003F), 255 (0x00FF), 1023 (0x03FF) and 4095 (0x0FFF)).

A data field for a maximum number of configuration record entries (partitions) allowed per disk (e.g., Max_Partitions) may be included in the DDF structure.

Controller data may be included in the DDF structure. The controller data generally comprises a controller globally unique ID field (e.g., Controller_GUID).

A controller type field (e.g., Controller_Type) may be included for controller with a PCI host interface. For controllers with a PCI host interface, the controller type field should contain a PCI ID of the controller. An example controller type field may be arranged as follows:
Byte 0-1: Vendor ID.
Byte 2-3: Device ID.
Byte 4-5: Sub Vendor ID.
Byte 6-7: Sub Device ID.

For controllers with a non-PCI host interface, bytes 6 and 7 of the field should be set to a default value (e.g., 0xFFFF). Bytes 0 through 5 may be set to any value at the discretion of the vendor.

A produce ID field (e.g., Product_ID) may be provided. The product ID field generally contains the product ID value to the controller that last operated on the RAID configuration. The product ID field may be an ASCII field. For controllers that operate using the SCSI protocol, the produce ID field should be set to the value of the product identification field returned by the controller as part of standard inquiry data. For ATA controllers, the field should be set to the value the controller would return for the product identification field in the standard inquiry data as described in the SCSI/ATA Translation (SAT) draft specification. For controllers that use neither the SCSI nor ATA protocols, the controller should create a product identification value for the field.

Physical disk record data may be included in the DDF structure. A number of Physical Disk Entries (PDE) used or populated (e.g., 3) may be included in a separate field (e.g., Populated_PDEs).

A maximum number of PDEs supported by vendor may be established in another field (e.g., Max_PD_Entries). Each PDE may be a 64-byte PDE.

A field for physical disk GUID (e.g., PD_GUID) may be provided for each physical disk entry. If the physical disk GUID entry refers to the physical disk on which it is currently stored, the value of the field should contain the same value as the PD_GUID field in the physical disk data section. For unused entries, the field should be filled with a default value (e.g., 0xFF).

A reference number field (e.g., PD_Reference) to be used in the virtual disk configuration records may be created for each physical disk entry. The physical disk field should have the value of the physical disk reference field of a physical disk corresponding physical disk data.

A physical disk type field (e.g., PD_Type) may contain a bit map describing the physical disk type. An example implementation of a physical disk type field may be as follows:
Bit 0: 0—Not using a forced PD_GUID.
  1—Using a forced PD_GUID (also called the Forced_PD_GUID_Flag).
Bit 1: 0—Not participating in a Virtual Disk (VD).
  1—Participating in a VD.
Bit 2: 0—Not a global spare.
  1—Global spare (VD Configuration Records may be ignored).
Bit 3: 0—Not a spare disk.
  1—Spare disk (Bit 2 and Bit 3 may be exclusive. Bit 3 should have precedence over Bit 2).
Bit 4: 0—Not foreign.
  1—Foreign (Dealing with a Foreign disk and the Foreign_Flag in the DDF Header on the disk should be set).
Bit 5: 0—Not a Pass-through/Legacy disk.
  1—Pass-through/Legacy disk (No DDF structure is stored on the physical disk as DDF structures may be stored on configured physical disks and in the controller. If no other configured physical disks are attached to the controller, the information may be stored in controller NVRAM. An implementation may restrict pass-through/legacy physical disks to systems with at least one configured disk attached to the RAID controller).
Bit 6: Reserved.
Bit 7: Reserved.
Bits 8-11: Reserved.
Bits 15-12: Interface Type.
  0x0=Unknown.
  0x1=SCSI (parallel).
  0x2=SAS.
  0x3=SATA.
  0x4=FC.
  0x5-0xF=Reserved.
All reserved bits should be set to 0.

A physical disk state field (e.g., PD_State) generally identifies the state of the physical disk as part of one or more virtual disks. An example implementation of a physical disk state field may be as follows:
Bit 0: 0—Offline.
  1—Online.
Bit 1: 0—OK.
  1—Failed.
Bit 2: 0—Not Rebuilding.
  1—Rebuilding (Physical disk rebuilding for a failed physical disk).
Bit 3: 0—Not in Transition.
  1—Transition (e.g., replacing a member physical disk through a copy operation).
Bit 4: 0—No PFA/SMART error alerts.
  1—PFA/SMART error alerts.
Bit 5: 0—No Unrecovered Read Errors.
  1—Unrecovered Read Errors.
Bit 6: 0—Not missing.
  1—Missing (a physical disk may be Failed and Missing).
Bit 7: Reserved.
Bits 8-15: Reserved.

All reserved bits should be set to 0. Bit 1 should have precedence among Bits 0-3. If Bit 0 and Bit 1 are both set, the physical disk status may be Failed and was probably online before the status change. For a physical disk participating in multiple virtual disks, the disk status Bits 1-3 should be set if any part of the physical disk is going through the corresponding process.

A configured size field (e.g., Configured_Size) generally defines a size of the physical disk in terms of the highest addressable Logical Block Address (LBA) during normal operation. The DDF structure should be stored at LBAs greater than or equal to the value in the configuration size field.

A path information field (e.g., PathInfo) may contain information on the path from a controller to a physical disk or an attach point of the physical disk. The field is generally used for information purposes only. The path information structure may depend on the physical disk interface type as defined in the PD_Type field (e.g., Bits 12-15).

For an SCSI interface type (e.g., 0x01), the path information structure should be interpreted as follows:
Bytes 0-3: Path 0 information.
　Bits 0-7: Logical Unit Number (LUN).
　Bits 8-15: SCSI Target ID.
　Bits 16-23: SCSI Channel.
　Bits 24-30: Reserved.
　Bit 31: 0—Path 0 OK.
　　1—Path 0 Broken.
Bytes 4-7: Path 1 information (for systems with multiple paths for redundancy).
　Bits 0-7: LUN.
　Bits 8-15: SCSI Target ID.
　Bits 16-23: SCSI Channel.
　Bits 24-30: Reserved.
　Bit 31: 0—Path 1 OK.
　　1—Path 1 Broken.
Bytes 8-17: Reserved.

For a SAS interface type (e.g., 0x02), the path information structure should be interpreted as follows:
Bytes 0-7: Path 0—SAS address of the end device (edge expander or controller) where the physical disk is attached.
Bytes 8-15: Path 1—SAS address of the end device (edge expander or controller) where the physical disk is attached.
Byte 16:
　Bit 0-6: Path 0 PHY identifier.
　Bit 7: 0—Path 0 OK.
　　1—Path 0 Broken.
Byte 17:
　Bit 0-6: Path 1 PHY identifier.
　Bit 7: 0—Path 1 OK.
　　1—Path 1 Broken.

All reserved bytes or bits should be set to 0. Path 1 information bytes should be set to a default value (e.g., 0xFF) when dual path support is not implemented for the physical disk. For FC and SATA physical disks, the field is undefined and all bytes should be set to a null value (e.g., 0x00).

Virtual disk record data may be provided in the DDF structure. The virtual disk record may include a populated virtual disk entries field (e.g., Populated_VDE). The populated virtual disk entries field generally contain a number of virtual disk entries used and/or configured.

A maximum number of virtual disk entries field (e.g., Max_VD_Entries) may define a maximum number of VDEs supported by the particular implementation.

Each of the virtual disk entries may include a virtual disk globally unique ID (e.g., VD_GUID).

A virtual disk number field (e.g., VD_Number) generally establishes a number for each virtual disk. The virtual disk number may be used to map directly to the IDs (e.g., Logical Unit Numbers) presented to the operating system as the result of an enumerated target type command (e.g., SCSI Report LUNs command). For internal SCSI RAID controllers, the virtual disk number may correspond directly to the LUN number reported to the operating system. However, for external RAID controllers that have LUN masking and LUN mapping, the virtual disk number may not be used for such a purpose and the RAID controller may have to implement a method for maintaining the information. The virtual disk number field should be managed during import and should be consistent across reboots. An example valid range may be 0-0x7FFF. The range 0x8000-0xFFFF is generally reserved.

A virtual disk type field (e.g., VD_Type) may be provided for each virtual disk entry. Each virtual disk type generally comprises a bitmap describing the type of virtual disk. An example implementation of the virtual disk type field may be as follows:
Bit 0: 0—Private.
　1—Shared (Disk Grouping should be enforced when the bit is set).
Bit 1: 0—No Disk Grouping.
　1—Disk Grouping Enforced.
Bit 2: 0—VD_Name in ASCII format.
　1—VD_Name in Unicode format.
Bit 3: 0—Owner ID Not Valid.
　1—Owner ID Valid.
Bits 15-4: Reserved.
Bits 31-16: Primary Controller GUID CRC.

The bits may be used as a hint for the last controller that owned a VD in a clustered environment. The value stored in the bits should be the 16-bit CRC of the Controller GUID. All reserved bits should be set to 0. Bits 16-31 should be ignored when Bit 0 is clear. If Bit 0 is set, the value of Bit 1 should be ignored since Disk Grouping is automatically enforced. If the Disk_Grouping field in the DDF Header is set to 0x01, Bit 1 should be ignored since Disk Grouping is automatically enforced for all disks. If Bit 1 is set, disk grouping should be enforced for all disks participating in the virtual disk. The bit generally allows disk grouping to be enforced on some drives in a DDF configuration and not enforced on other drives. If Bit 2 is set, the value stored in the VD_Name field should be compliant with Version 4.0 of the Unicode standard. If Bit 3 is clear, Bits 16-31 may be invalid. If Bit 3 is set, Bits 16-31 may be valid.

A virtual disk state field (e.g., VD State) generally comprises a bitmap describing the state of the virtual disk. An example implementation of the virtual disk state field may be as follows:
Bits 0-2: 0x00—Optimal (The VD is operating and has experienced no failures of the disks that comprise VD.)
　0x01=Degraded (The VD has experienced at least one failure of the disks that comprise the VD. One more disk failure could result in the VD being placed in the "Failed" state indicating data loss has occurred.)
　0x02=Deleted (The VD has been marked as deleted by the system.)
　0x03=Missing (The VD has been marked as missing by the system.)
　0x04=Failed (The VD has experienced enough failures of the disks that comprise the VD for unrecoverable data loss to occur.)
　0x05=Partially Optimal (The VD has experienced disk failures. The VD can experience at least one more disk failure before it is placed in the "Degraded" state.)
　0x06=Reserved.
　0x07=Reserved.

Bit 3: 0—Not Morphing
   1—Morphing (The VD is performing a morphing activity: RAID level migration, online capacity expansion, shrinking, defragmenting, stripe size migration, etc.)
Bit 4: 0—VD Consistent.
   1—VD Not Consistent.
Bits 5-7: Reserved.

All reserved bits should be set to 0. When the Morphing bit (Bit 3) is set, the VD may not be imported to another controller from a different vendor as the new controller may not be able to determine the state or type of morphing activity. No voluntary migrations of physical disks between controllers from different vendors should be allowed when virtual disks associated with the physical disks are in a Morphing state. The VD Not Consistent bit (Bit 4) should be set when a controller cannot guarantee a virtual disk is consistent. The term "consistent" designates the state when all writes to a virtual disk by a client computer system, which may be acknowledged as successfully completed by the controller, have been correctly written to the virtual disk, including any redundancy information (e.g., parity). The bit should be cleared for a virtual disk on a clean shutdown of the system. The bit may also be cleared during idle periods after a controller has determined that all writes have been consistently written to the virtual disk. The bit should not be used as an actual cache synchronization flag.

An initialization state field (e.g., Init_State) may define an initialization state. An example implementation of the initialization state field may be as follows:
Bits 0-1: Initialization State.
   0x00=Not Initialized.
   0x01=Quick Initialization in Progress.
   0x02=Fully Initialized.
   0x03=Reserved.
Bits 2-5: Reserved.
Bits 6-7: User Access Mode.
   0x00=Read/Write.
   0x01=Reserved.
   0x02=Read Only.
   0x03=Blocked (User reads and writes denied).

The Quick Initialization In Progress state may be used to indicate that the virtual disk is being initialized but is still available for read and/or write access.

A virtual disk name field (e.g., VD_Name) may be used to contain a multi-byte string (e.g., 16-byte ASCII or Unicode) string that names the virtual disk. Bit 2 of the virtual disk type field should be used to determine the Unicode format or the ASCII format of the field. The field may match a volume name used by some operating systems. If the field is not used, all bytes should be set to zero.

A configuration record may be included in the DDF structure. The configuration record may include a virtual disk configuration record field for each of the virtual disks. Each of the virtual disks generally includes the virtual disk globally unique ID field (e.g., VD_GUID).

A primary element count field (e.g., Primary_Element_Count) may define the number of physical disks used in a basic virtual disk.

A stripe size field (e.g., Stripe_Size) may contain a stripe depth. In some embodiments, the stripe depth may comprise a $512 \times 2^N$ format, where N may be the value of the field. Other formats may be implemented to meet the criteria of a particular application. Examples of the stripe size may be as follows:
   n=0-512 Byte stripe depth.
   n=1-1 kilobyte (KB) stripe depth.
   n=2-2 KB stripe depth.
   n=3-4 KB stripe depth.
   n=7-64 KB stripe depth.
   n=11-1 MB stripe depth, and the like.

A primary RAID level field (e.g., Primary_RAID_Level) may establish a RAID level of a Basic Virtual Disk (BVD).

A RAID level qualifier field (e.g., RAID_Level_Qualifier) generally contains a RAID level value.

A secondary element count field (e.g., Secondary_Element_Count) may set the number of BVDs in a virtual disk with a secondary RAID level (e.g., RAID 50) as defined. For virtual disks without a secondary RAID level, the field should be set to 1.

A secondary element sequence field (e.g., Secondary_Element_Seq) generally establishes a position of a current basic virtual disk in secondary the virtual disk. The secondary element sequence field value may be valid only if Secondary_Element_Count>1.

A secondary RAID level field (e.g., Secondary_RAID_Level) may define the secondary RAID level. The secondary RAID level field may be valid only if Secondary_Element_Count>1.

A block count field (e.g., Block_Count) generally sets a size in blocks of the partition on the physical disk that is participating in the virtual disk. The block count field generally applies to the physical disk on which the configuration record is stored. The field states the size, in blocks, of the partition on the physical disk that is participating in the virtual disk described by the particular configuration record in which the block count field resides.

A size field (e.g., Size) may define a size of a user addressable space in the virtual disk. The size may be stated in numbers of blocks.

An associated spares field (e.g., Associated_Spares) may contain eight 4-byte entries for the associated spare physical disks. Each used entry should contain the PD_Reference defined in the Physical Disk Entry for the associated spare physical disk. Unused entries should be set to a default value (e.g., 0xFFFFFFFF).

An example implementation of the associated spares field may be as follows:
   Bytes 0-3: Spare Entry 0.
   Bytes 4-7: Spare Entry 1.
   Bytes 8-11: Spare Entry 2.
   Bytes 12-15: Spare Entry 3.
   Bytes 16-19: Spare Entry 4.
   Bytes 20-23: Spare Entry 5.
   Bytes 24-27: Spare Entry 6.
   Bytes 28-31: Spare Entry 7.
The field may be used to detect missing dedicated spares as Spares Assignment Records may be local.

A cache policies field (e.g., Cache_Policies) may establish the cache policies for the virtual disk. The cache policies, methods and parameters are generally implementation dependent. Therefore, bytes 1 through 7 may be vendor specific.

Byte 0 may be a bit field where the bits are defined as:
Bit 0: 0—Write-Through.
   1—Write-Back.
Bit 1: 0—Always (ignored if Bit 0=0).
   1—Adaptive (ignored if Bit 0=0).
Bit 2: 0—No Read Ahead.
   1—Read Ahead.
Bit 3: 0—Always (ignored if Bit 2=0).
   1—Adaptive (ignored if Bit 2=0).
Bit 4: 0—No write caching if battery low or not present.
   1—Write caching allowed if battery low or not present.
Bit 5: 0—No write caching allowed.
   1—Write caching allowed.

Bit 6: 0—No read caching allowed.
  1—Read caching allowed.
Bit 7: 0—No vendor specific caching technique.
  1—Vendor specific caching technique.

Bits 4-6 may be master enable/disable settings for cache parameters. If Bit 7 is set, Bits 0-3 should be left clear and ignored while Bits 4-6 should still be used. During vendor migration if Bit 7 is found set, the user should be notified and Bit 7 should be cleared. Bits 0-3 should be set to controller default and Bits 4-6 should be preserved.

A background task rate field (e.g., BG_Rate) may be used to assign background task priorities to individual virtual disks. Examples of background tasks may include, but are not limited to: initialization, RAID level migration, expansion, etc. If the field is set to a default value (e.g., 0xFF), no background task rate has been set for the virtual disk and the controller defaults should be used. If the field has a value in a range (e.g., 0x00 through 0xFA), the virtual disk should be assigned the relative priority for all background tasks. Zero (e.g., 0x00) is generally the lowest priority and a predetermined high value (e.g., 0xFA) is generally the highest priority. The actual weighting of the background task priorities may be implementation dependent.

A physical disk sequence field (e.g., Physical_Disk_Sequence) may define the sequence of physical disks in the BVD. The field generally contains multiple 4-byte entries. Each used entry should be a physical disk reference from a Physical_Disk_Entry. Unused entries should be filled with a default value (e.g., 0xFFFFFFFF). Used entries may provide a primary element sequence in ascending order. For the BVD, the number of used entries should equal the Primary_Element_Count in the Virtual_Disk_Configuration_Record for the BVD. If a physical disk that was part of the virtual disk has been removed from the virtual disk, reconfigured as part of another virtual disk, and then returned to the system containing the original virtual disk, the PD_Reference entry for the returned physical disk should be set to a null value (e.g., 0x00000000). The null value may prevent the controller from erroneously reading the data from the replaced drive as part of the current Virtual disk. The physical disk sequence field may be a variable size field. The size is generally determined as Max_Primary Element_Entries×4.

A starting block field (e.g., Starting_Block) generally gives the starting LBAs for the partitions of the physical disks participating in the BVD. The field may be variable in size and comprises 8-byte entries. Each entry generally contains an 8-byte LBA. Each entry may correspond to the physical drive with the PD_Reference stored in the same entry index in Physical_Disk_Sequence. An entry should contain the starting LBA of a corresponding physical disk partition that is part of the BVD. Unused entries should be filled with a default value (e.g., 0xFFFFFFFFFFFFFFFF). The size is generally determined as Max_Primary_Element_Entries×8.

A spare assignment record may be provided for each of the virtual disk records. The spare assignment record may comprise a spare type field (e.g., Spare_Type). The spare type field may define global spares, dedicated spares, enclosure affinities and the like. An example implementation of the spare type field may be as follows:

Bit 0: 0—Global.
  1—Dedicated.
Bit 1: 0—Committable.
  1—Revertible.
Bit 2: 0—Not Active.
  1—Active.
Bit 3: 0—No Enclosure Affinity.
  1—Enclosure Affinity.
Bits 4-7: Reserved.

The reserved bits should be set to 0. Committable spares (e.g., Bit 1=0) generally become permanent members of virtual disks after a rebuild. Revertible spares (e.g., Bit 1=1) may revert to "spare" status after the replacement of the original failed physical disk. An import, merge or roaming action may result in a commitment of an active (failed-over) revertible spare. An active spare may be currently host user data on a virtual disk for a failed physical disk. A spare with enclosure affinity may be used as a spare for virtual disks that reside on disks in the same enclosure as the spare. Keeping track of which disks are associated with a particular enclosure is generally implementation dependent.

A virtual disk GUID field (e.g., VD_GUID) may contain the globally unique ID of a virtual disk to which the spare physical disk is assigned.

A secondary element field (e.g., Secondary_Element) may convey a number to which the spare physical disk is assigned. If the spare is not assigned to a particular secondary element, the field may be set to a default value (e.g., 0xFFFF).

Figure 4:
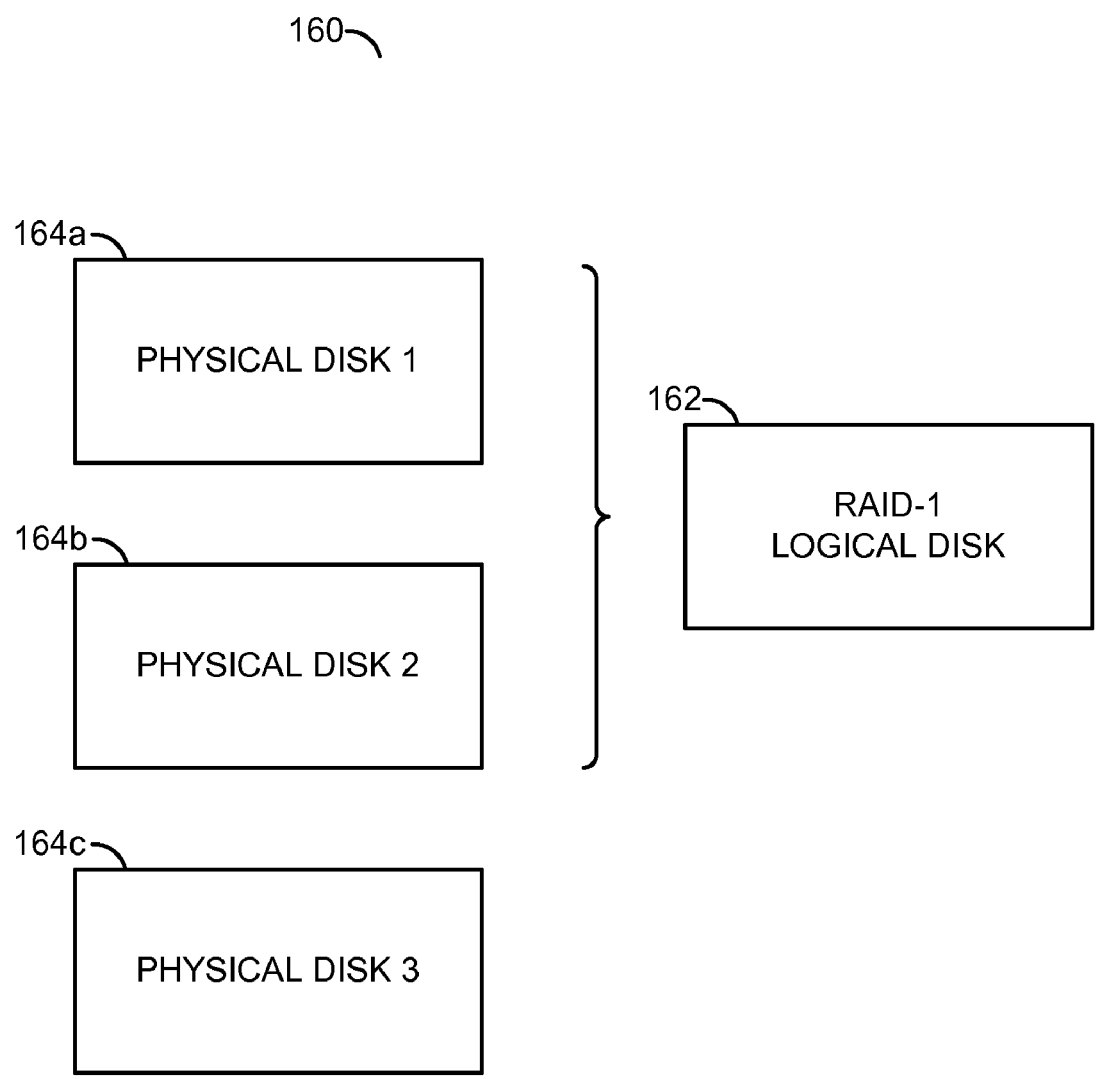
FIG. 4 is a diagram of an example configuration.

Referring to FIG. 4, a diagram of an example configuration 160 is shown. The configuration 160 may create a RAID-1 configured device 162 using a few physical devices (e.g., 164a and 164b) from a set of multiple physical devices 164a-164c. An example XML structure to program the configuration 160 may be as follows:

Full Configuration field; and
Unique request ID field.
In a DDF SNMP header:
  DDF header GUID field;
  Disk grouping field;
  Maximum physical device entries field;
  Maximum virtual disk entries field; and
  Maximum partitions field.
In a controller data record:
  Populated PDE field (e.g., 3); and
  Maximum physical device entries field.
  For a first physical device entry:
    Physical device GUID field (e.g., GUID_PD_00);
    Physical device reference field (e.g., 1);
    Physical device type field (e.g., Participating);
    Physical device state field;
    Configured size field; and
    Path information field.
  For a second physical device entry:
    Physical device GUID field (e.g., GUID_PD_01);
    Physical device reference field (e.g., 2);
    Physical device type field (e.g., Participating);
    Physical device state field;
    Configured size field; and
    Path information field.
  For a third physical device entry:
    Physical device GUID field (e.g., GUID_PD_02);
    Physical device reference field (e.g., 3);
    Physical device type field (e.g., Not Participating);
    Physical device state field;
    Configured size field; and
    Path information field.
In a virtual disk record:
  Populated virtual disk entry field;
  Maximum virtual disk entries field;
  For a virtual disk entry:
    Virtual disk GUID field (e.g., GUID_VD_00);
    Virtual disk number field (e.g., OO);
    Virtual disk type field (e.g., private and disk grouping enforced);
    Virtual disk state field;
    Initialization state field; and
    Virtual disk name field.
In a configuration record:
  For a first virtual disk configuration record:
    Virtual disk GUID field (e.g., GUID_VD_00);

-continued

Primary element count field (e.g., 2);
    Stripe size field;
    Primary RAID level field (e.g., 0x01);
    RAID level qualifier field (e.g., 0x00);
    Secondary element count field (e.g., 1);
    Secondary element sequence field;
    Secondary RAID level field;
    Block count field (e.g., 0000000000032000);
    Size field (e.g. ,0000000000096000);
    Associated spares field (e.g., 0xFFFF);
    Cache policies field (e.g., 000000000000007D);
    Background rate field;
    Physical disk sequence field (e.g., 00000001, 00000002,
    FFFFFFFF ... FFFFFFFF ); and
    Starting block field (e.g., 00000000000000,
    00000000000000,  FFFFFFFFFFFFFFFF  ... FFFFFFFF
    FFFFFFFF).
In a spare assignment record:
    Spare type field (e.g., FFFF)
    For each spare assignment entries
        Virtual disk GUID field (e.g., FFFF); and
        Secondary element field (e.g., FFFFF).

Figure 5:
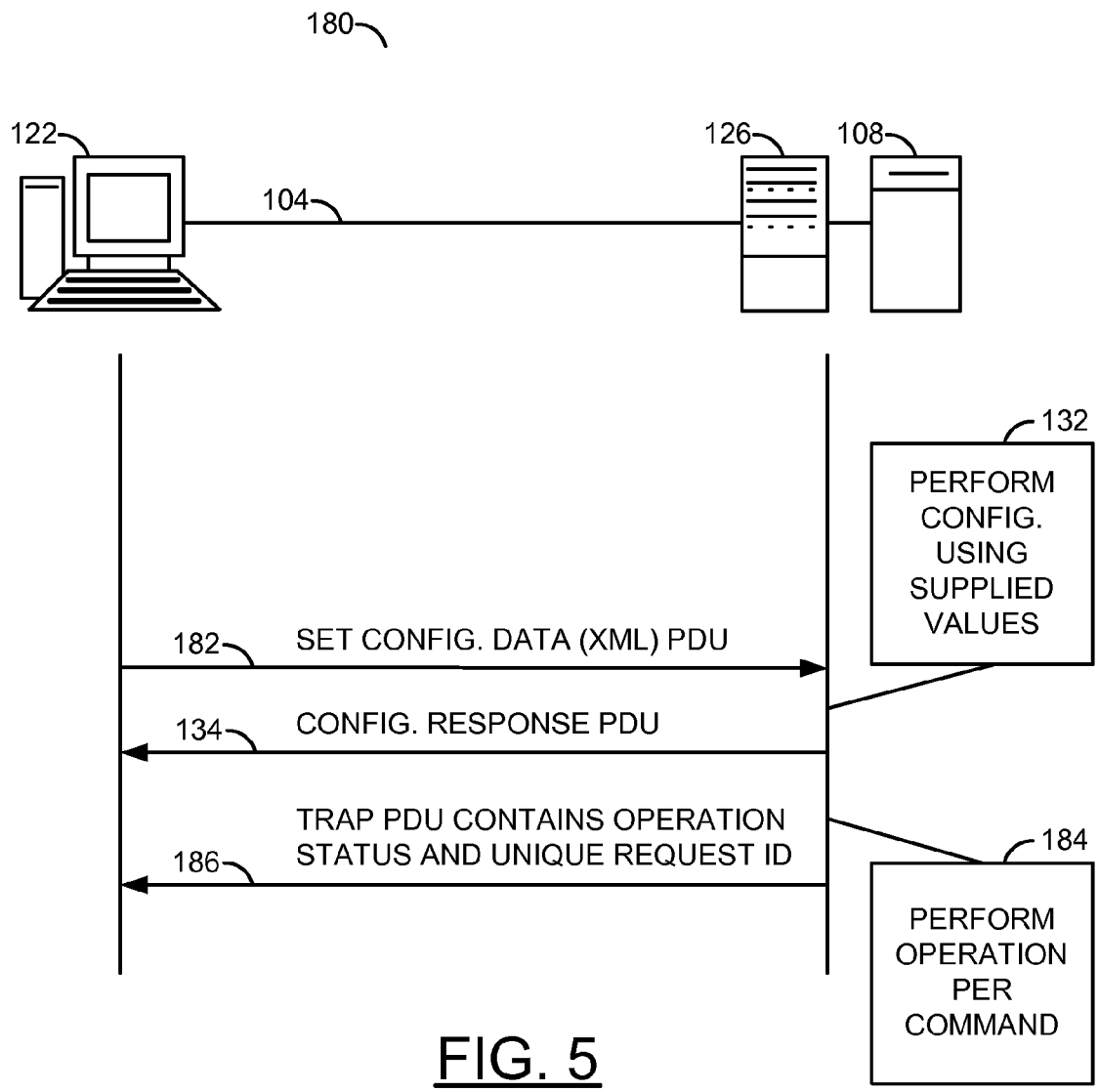
FIG. 5 is a flow diagram of an example configuration and requested operation of the system.

Referring to FIG. 5, a flow diagram of an example a configuration and requested operational 180 of the system 120 is shown. The device 122 may prepare, transform, package and transmit a single PDU 182 containing all of a unique request ID, new configuration information and an operation command. After parsing the XML and calculating the configuration changes, the device 126 may reconfigure 132 the memory device 108 as instructed. The device 126 may then send the status PDU 134 back to the device 122 conveying a status message regarding the configuration. Once the memory device 108 has been reconfigured, the device 126 may command the memory device 108 to perform the requested operation 184 received in the PDU 182. After the memory device 108 has completed the requested operation, the device 126 may transmit a trap PDU 186 containing operation status and the unique request ID for the requested operation.

A minimum size of the DDF formatted XML data may be determined by equation 1 as follows:

$$\begin{aligned}&= \text{Size of } (XML \text{ Tag}) + \text{Size of } (DDF \text{ Data}) \\ &= \text{Size of } (XML \text{ Tag}) + \\ &\quad (\text{Size of } (DDF \text{ Header}) + \text{Size of (Controller Data)} + \\ &\quad \text{Size of (Physical Disk Record)} + \\ &\quad \text{Size of (Virtual Disk Records)} + \\ &\quad \text{Size of (Configuration Records)}) \end{aligned} \quad \text{Eq. (1)}$$

The size of (DDF Header) may be expressed per equation 2 as follows:

$$\begin{aligned}&= \text{Size of (DDF\_Header\_GUID)} + \\ &\quad \text{Size of (Disk\_Grouping)} + \text{Size of (Max\_PD\_Entries)} + \\ &\quad \text{Size of (Max\_VD\_Entries)} + \text{Size of (Max\_Partitions)} \end{aligned} \quad \text{Eq. (2)}$$

Since all the above data may be optional, the data may be omitted leaving the size of (DDF Header) as zero bytes.

The size of (Controller Data) may be given by equation 3 as follows:

$$\begin{aligned}= \text{Size of (Controller\_GUID)} + \\ \text{Size of (Controller\_Type)} + \text{Size of (Product\_ID)}\end{aligned} \quad \text{Eq. (3)}$$

By omitting the optional data from equation 3, the size of (Controller Data) may be reduced to equation 4 as follows:

$$\begin{aligned}&= \text{Size of (Controller\_GUID)} \\ &= 24 \text{ bytes}\end{aligned} \quad \text{Eq. (4)}$$

The size of (Physical Disk Record) may be expressed by equation 5 as follows:

$$\begin{aligned}&= \text{Size of (Physical Disk Record)} + \\ &\quad \text{Size of (Physical Disk Entries)} \\ &= \text{Size of (Physical Disk Record)} + \\ &\quad nPD \times \text{Size of (One Physical Disk Entries)} \\ &= \text{Size of (Populated\_PDEs)} + \text{Size of (Max\_PD\_Entries)} + \\ &\quad nPD \times (\text{Size of (PD\_GUID)} + \text{Size of (PD\_Reference)} + \\ &\quad \text{Size of (PD\_Type)} + \text{Size of (PD\_State)} + \\ &\quad \text{Size of (Configured\_Size)} + \text{Size of } (PathInfo))\end{aligned} \quad \text{Eq. (5)}$$

By omitting optional data and if the total number of physical devices=nPD, the size of (Physical Disk Record) may be reduced to equation 6 as follows:

$$\begin{aligned}&= nPD \times (sizeof \text{ (PD\_Reference)}) \\ &= nPD \times 4 \text{ bytes}\end{aligned} \quad \text{Eq. (6)}$$

The size of (Virtual Disk Records) may be given by equation 7 as follows:

$$\begin{aligned}&= \text{Size of (Virtual Disk Records)} + \\ &\quad \text{Size of (Virtual Disk Entries)} \\ &= \text{Size of (Populated\_VDEs)} + \text{Size of (Max\_VD\_Entries)} + \\ &\quad nVD \times (\text{Size of (VD\_GUID)} + \text{Size of (VD\_Number)} + \\ &\quad \text{Size of (VD\_Type)} + \text{Size of (VD\_State)} + \\ &\quad \text{Size of (Init\_State)} + \text{Size of (VD\_Name)})\end{aligned} \quad \text{Eq. (7)}$$

If the total number of virtual disks=nVD, the size of (Virtual Disk Records) may be reduced to equation 8 as follows:

$$\begin{aligned}= nVD \times (\text{Size of (VD\_GUID)} + \\ \text{Size of (VD\_Number)} + \text{Size of (VD\_Type)})\end{aligned} \quad \text{Eq. (8)}$$

By omitting optional data, the size of (Virtual Disk Records) may be reduced to equation 9 as follows:

$$= nVD \times (24 + 2 + 4) \text{ bytes} \quad \text{Eq. (9)}$$

$$= nVD \times 30 \text{ bytes}$$

The size of (Configuration Records) may be expressed by equation 10 as follows:

$$= \text{Size of (Virtual\_Disk\_Configuration\_Record\_Fields)} + \quad \text{Eq. (10)}$$

$$\text{Size of (Spare\_Assignment\_Record)}$$

$$= nVD\_Config \times \text{Size of}$$

$$\text{(One Virtual\_Disk\_Configuration\_Record\_Fields)} +$$

$$\text{Size of (Spare\_Assignment\_Record)} +$$

$$nSpare \times \text{Size of (Spare\_Assignment\_Entries)}$$

If the total number of virtual disk configurations=nVD_Config and the number of spare drives=nSpare, the size of (Configuration Records) may be rewritten per equation 11 as follows:

$$= nVD\_Config \times (\text{Size of (VD\_GUID)} + \quad \text{Eq. (11)}$$

$$\text{Size of (Primary\_Element\_Count)} +$$

$$\text{Size of (Primary\_RAID\_Level)} +$$

$$\text{Size of (RAID\_Level\_Qualifier)} +$$

$$\text{Size of (Secondary\_Element\_Count)} +$$

$$\text{Size of (Secondary\_Element\_Seq)} +$$

$$\text{Size of (Secondary\_RAID\_Level)} +$$

$$\text{Size of (Block\_Count)} + \text{Size of (Size)} +$$

$$\text{Size of (Associated\_Spares)} +$$

$$\text{Size of (Cache\_Policies)} + \text{Size of (BG\_Rate)} +$$

$$\text{Size of (Physical\_Disk\_Sequence)} +$$

$$\text{Size of (Starting\_Block)} +$$

$$(\text{Size of (Spare\_Type)}) +$$

$$(nSpare \times \text{Size of (Secondary\_Element)})$$

Omitting optional data generally reduces the size of (Configuration Records) to equation 12 as follows:

$$= nVD\_Config \times (24 + 2 + 1 + 1 + 1 + 1 + 1 + 8 + 8 + 32 + 8 + \quad \text{Eq. (12)}$$

$$(4 \times nPD) + (nPD \times 8)) + 1 + nSpare \times 2 \text{ bytes}$$

$$= (nVD\_Config \times (87 + (12 \times nPD))) + 1 + (nSpare \times 2)$$

Applying the above information, the minimum size of the XML formatted DDF data may be defined by equation 13 as follows:

$$= \text{Size of (XML Tag)} + \quad \text{Eq. (13)}$$

$$(\text{Size of (DDF Header)} + \text{Size of (Controller Data)} +$$

$$\text{Size of (Physical Disk Record)} +$$

$$\text{Size of (Virtual Disk Records)} +$$

$$\text{Size of (Configuration Records)})$$

$$= \text{Size of (XML Tag)} + 0 + 24 + (nPD \times 4) + (nVD \times 30) +$$

$$(nVD\_Config \times (87 + (12 \times nPD))) + 1 + (nSpare \times 2)$$

$$= \text{Size of (XML Tag)} + 24 + (nPD \times 4) + (nVD \times 30) +$$

$$(nVD\_Config \times (87 + (12 \times nPD))) + 1 + (nSpare \times 2)$$

$$= \text{Size of (XML Tag)} + 25 + (nSpare \times 2) + (nPD \times 4) +$$

$$(nVD \times 30) + (nVD\_Config \times (87 + (12 \times nPD))) \text{ bytes}$$

The size of the XML formatted DDF data may also depend on a size of an XML tag. Therefore, by choosing a small tag name of the XML, a data size may be reduced. Thus, the SNMP-PDU size may also be reduced.

Binary data may be encoded on the XML structure, because several variables in the DDF structure contain binary data like Controller_Data, PD_Type and so on. Several different binary data representation techniques are generally available in XML: embed the binary data directly in the XML document using a CDATA, refer to the binary data using a Universal Resource Locator (URL), encode the binary data into a text-based format that may be set as the contents of an XML element and the like. A user may choose any suitable encoding scheme. The CDATA sections generally provide a mechanism to inform the parser of a lack of markup in the characters contained by the CDATA section. As such, creating documents containing sections where markup characters appear, but where no markup is intended, may be easier to create. The CDATA sections may be used for scripting language content and sample XML and HyperText Markup Language (HTML) content. In some embodiments, alternate markup languages (e.g., Standard Generalized Markup Language (SGML), Extensible HyperText Markup Language (XHTML), etc.) may be used instead of using the XML language.

The present invention may provide efficient implementation as everything used in the scheme may be standard based, such as SNMP, XML and DDF. No compulsion to invent a new communication protocol and/or a new data security scheme may exist as the SNMP protocol may provide such features. Since XML is a widely used industry standard, many common libraries are generally available for parsing the XML format. The present invention generally comprises a vendor-independent solution because proprietary technology is not used in the architecture. The XML may also improve the readability of the configuration information and operation commands. For example, the XML may be helpful for detecting errors and/or debugging. The XML may contain all of the information in the DDF format, depending on the user specifications. The Common RAID Disk Data Format may be readily available from the SNIA. The XML may serve all SNIA DDF supported vendors as the XML contains DDF structure. Furthermore, the present invention involves transmitting just a few packet. Therefore, the present invention may not adversely impact network Quality of Service (QoS) levels and/or network traffic.

The functions performed by the diagrams of FIGS. 1-5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. A method of configuring a storage device, comprising the steps of:
    (A) receiving a single data unit over a communication network, said data unit defining both (i) a plurality of new configuration items that define a new configuration of said storage device and (ii) a command to be performed by said storage device;
    (B) calculating at least one configuration change by differentiating a plurality of current configuration items with said new configuration items, said current configuration items defining a current configuration of said storage device; and
    (C) adjusting said storage device into said new configuration based on said at least one configuration change.

2. The method according to claim 1, further comprising the step of:
    creating a new data structure from said new configuration items, said new data structure having a standard data structure format.

3. The method according to claim 2, further comprising the step of:
    reading a current data structure from said storage device to an agent device, said current data structure containing said current configuration items.

4. The method according to claim 2, wherein said new data structure comprises a Common RAID Disk Data Format.

5. The method according to claim 1, wherein said data unit is transferred via said communication network using a standard communication protocol.

6. The method according to claim 1, wherein said data unit comprises information arranged in an Extensible Markup Language.

7. The method according to claim 1, wherein said storage device comprises a Redundant Array of Inexpensive Disks.

8. The method according to claim 1, further comprising the steps of:
    generating a new data structure in a manager device, said new data structure (i) comprising said new configuration items and (ii) having a standard data structure format; and
    transforming said new data structure and said command into a document in a markup language format.

9. The method according to claim 8, further comprising the step of:
    packaging said document into said data unit before transmitting via said communication network.

10. The method according to claim 1, further comprising the step of:
    transmitting a message to a manager device via said communication network, said message comprising a status of a requested operation performed using said storage device in said new configuration.

11. A system comprising:
    a storage device having a current configuration defined by a plurality of current configuration items; and
    an agent device configured to (i) receive a single data unit over a communication network, said data unit defining both (a) a plurality of new configuration items that define a new configuration of said storage device and (b) a command to be performed by said storage device, (ii) calculate at least one configuration change by differentiating said current configuration items with said new configuration items and (iii) adjust said storage device into said new configuration based on said at least one configuration change.

12. The system according to claim 11, wherein said agent device is further configured to create a new data structure from said new configuration items, said new data structure having a standard data structure format.

13. The system according to claim 12, wherein said agent device is further configured to read a current data structure from said storage device, said current data structure containing said current configuration items.

14. The system according to claim 12, wherein said new data structure comprises a Common RAID Disk Data Format.

15. The system according to claim 11, wherein said data unit is transferred via said communication network using a standard communication protocol.

16. The system according to claim 11, wherein said data unit comprises information arranged in an Extensible Markup Language.

17. The system according to claim 11, wherein said storage device comprises a Redundant Array of Inexpensive Disks.

18. The system according to claim 11, further comprising a manager device configured to (i) generate a new data structure in said manager device, said new data structure (a) comprising said new configuration items and (b) having a standard data structure format and (ii) transform said new data structure and said command into a document in a markup language format.

19. The system according to claim 18, wherein said manager device is further configured to package said document into said data unit before transmitting via said communication network.

20. A system comprising:
    means for storing having a current configuration defined by a plurality of current configuration items;
    means for receiving a single data unit over a communication network, said data unit defining both (i) a plurality of new configuration items that define said new configuration of said means for storing and (ii) a command to be performed by said means for storing;

means for calculating at least one configuration change by differentiating said current configuration items with said new configuration items; and means for adjusting said means for storing into said new configuration based on said at least one configuration change.

* * * * *